(12) United States Patent
Yushin et al.

(10) Patent No.: US 11,843,114 B2
(45) Date of Patent: Dec. 12, 2023

(54) CORE-SHELL COMPOSITES FOR ELECTRODES IN METAL-ION BATTERIES

(71) Applicant: Sila Nanotechnologies, Inc., Alameda, CA (US)

(72) Inventors: Gleb Yushin, Atlanta, GA (US); Bogdan Zdyrko, Atlanta, GA (US); Igor Luzinov, Seneca, SC (US); Vojtech Svoboda, Atlanta, GA (US); Alexander Jacobs, Atlanta, GA (US); Eugene Berdichevsky, Alameda, CA (US); Hyea Kim, Atlanta, GA (US)

(73) Assignee: SILA NANOTECHNOLOGIES, INC., Alameda, CA (US)

(*) Notice: Subject to any disclaimer, the term of this patent is extended or adjusted under 35 U.S.C. 154(b) by 0 days.

(21) Appl. No.: 17/820,413

(22) Filed: Aug. 17, 2022

(65) Prior Publication Data
US 2022/0393158 A1 Dec. 8, 2022

Related U.S. Application Data

(63) Continuation of application No. 16/595,370, filed on Oct. 7, 2019, now Pat. No. 11,424,443, which is a continuation of application No. 14/564,472, filed on Dec. 9, 2014, now Pat. No. 10,439,207, which is a continuation of application No. 13/776,360, filed on Feb. 25, 2013, now Pat. No. 8,932,764.

(60) Provisional application No. 61/604,394, filed on Feb. 28, 2012.

(51) Int. Cl.
| H01M 4/36 | (2006.01) |
| H01M 4/136 | (2010.01) |
| H01M 4/38 | (2006.01) |
| H01M 4/58 | (2010.01) |
| H01M 4/62 | (2006.01) |
| H01M 10/0525 | (2010.01) |
| H01M 4/04 | (2006.01) |
| H01M 4/1397 | (2010.01) |
| H01M 4/02 | (2006.01) |

(52) U.S. Cl.
CPC ........... *H01M 4/366* (2013.01); *H01M 4/136* (2013.01); *H01M 4/38* (2013.01); *H01M 4/5815* (2013.01); *H01M 4/5825* (2013.01); *H01M 4/625* (2013.01); *H01M 10/0525* (2013.01); *H01M 4/0421* (2013.01); *H01M 4/1397* (2013.01); *H01M 2004/028* (2013.01)

(58) Field of Classification Search
CPC ...... H01M 4/505; H01M 4/131; H01M 4/525; H01M 10/058; H01M 10/446; H01M 2004/021; H01M 2004/028
See application file for complete search history.

(56) References Cited

U.S. PATENT DOCUMENTS

2013/0337347 A1* 12/2013 Pol .................... H01M 4/583 568/18

* cited by examiner

*Primary Examiner* — Cynthia K Walls
(74) *Attorney, Agent, or Firm* — MUNCY, GEISSLER, OLDS & LOWE, P.C.; Daniel Podhajny

(57) ABSTRACT

A battery electrode composition is provided comprising core-shell composites. Each of the composites may comprise a core and a multi-functional shell.

39 Claims, 11 Drawing Sheets

CORE-SHELL COMPOSITES FOR ELECTRODES IN METAL-ION BATTERIES

CROSS-REFERENCE TO RELATED APPLICATIONS

The present application for patent is a Continuation of U.S. patent application Ser. No. 16/595,370, entitled "Core-Shell Composites for Electrodes in Metal-Ion Batteries," filed Oct. 7, 2019, which is a Continuation of U.S. patent application Ser. No. 14/564,472, entitled "Core-Shell Composites for Electrodes in Metal-Ion Batteries," filed Dec. 9, 2014, which is a Continuation of U.S. patent application Ser. No. 13/776,360, entitled "Core-Shell Composites for Sulfur-Based Cathodes in Metal-Ion Batteries," filed Feb. 25, 2013, which claims priority to Provisional Application No. 61/604,394, entitled "Core-Shell Nanoparticles for Sulfur-Containing Cathodes in Metal-Ion Batteries," filed Feb. 28, 2012, each of which are expressly incorporated by reference herein.

BACKGROUND

Field

The present disclosure relates generally to energy storage devices, and more particularly to metal-ion battery technology and the like.

Background

Owing in part to their relatively high energy densities, light weight, and potential for long lifetimes, metal-ion batteries are used extensively in consumer electronics. In fact, lithium-ion (Li-ion) batteries, for example, have essentially replaced nickel-cadmium and nickel-metal-hydride batteries in many applications. Despite their increasing commercial prevalence, further development of these batteries is needed, particularly for applications in low- or zero-emission hybrid-electrical or fully-electrical vehicles, energy-efficient cargo ships and locomotives, aerospace, and power grids. Such high-power applications will require electrodes with higher specific capacities than those used in currently existing Li-ion batteries.

Sulfur and sulfur-containing compounds have been investigated as a potential source for higher specific capacity electrodes, in addition to offering a number of other advantages, including a high theoretical specific capacity (1672 mAh/g), high energy density, low voltage operation, and relative material abundance. Sulfur's specific capacity is the highest among solid cathode compounds known for rechargeable Li-ion batteries and an order of magnitude greater than currently available commercial cathodes. Its ultra-high specific capacity can enable exceptional gravimetric and volumetric energy densities in rechargeable batteries (e.g., 2600 Wh/kg and 2800 Wh/l, respectively), which is around 4-10 times higher than that of current state of the art Li-ion batteries. Electrochemical reactions in Li/S cells occur at relatively low voltage (e.g., approximately 30-40% lower than that observed in conventional cathodes), allowing greater flexibility in designing electronic components and minimizing safety risks associated with high voltage cathodes. Sulfur is also found abundantly in nature, low cost, and light weight, in addition to having a relatively low toxicity.

For all of these reasons, sulfur-based cathodes are being investigated as a cost-effective, environmentally friendly, performance enhancing component of metal-ion batteries. However, realization of the full potential of sulfur-based cathodes in metal-ion batteries has been hindered by a number of significant challenges, including low electrical conductivity, low ionic conductivity, and the physical instability of conventional sulfur-based cathodes. Sulfur and sulfur-containing compounds are highly electrically insulating. The ionic conductivity of lithium in sulfur and sulfur-compounds is also very small, which typically slows down the overall rate of the electrochemical reactions and leads to low power characteristics in Li/S cells. In addition, sulfur cathodes generate intermediate electrochemical reaction products (polysulfides, such as $Li_2S_n$) that are highly soluble in conventional organic electrolytes. This leads to sulfur cathode dissolution and re-deposition of electrically-insulating precipitates on the anode surface, preventing full reversibility of the electrochemical reaction.

Thus, despite the theoretical advantages of sulfur-based cathodes, practical application in metal-ion batteries is difficult to achieve. Several approaches have been developed to overcome these difficulties, but none have been fully successful in overcoming all of them. For example, some conventional designs have attempted to address the low electrical conductivity by using a conductive carbon additive to form C—S composites, but this does not address the ionic conductivity or cathode instability. Other conventional designs have attempted to address the ionic conductivity by using special electrolytes that cause the sulfur to swell, but this often increases the rate of sulfur dissolution. Still other conventional designs have attempted to improve electrochemical reversibility by eliminating or preventing polysulfide anion precipitation on the anode surface (e.g., via electrolyte additives to dissolve insulating sulfur-containing precipitates), but this does not address the more critical problem of sulfur cathode dissolution, or low electrical and ionic conductivity.

One of the more advanced approaches for sulfur cathode stabilization involves the formation of porous S—C composites by forming a porous carbon matrix and partially filling it with sulfur via melt or solution infiltration. This approach, however, still suffers from low volumetric capacity of the produced composites and still has an unsatisfactorily high cathode dissolution rate.

Accordingly, conventional approaches to address sulfur-based cathode shortcomings have found only limited success. There remains a need for better ways to address the low electrical and ionic conductivity as well as physical instability of sulfur-based cathodes in metal-ion batteries.

SUMMARY

Embodiments disclosed herein address the above stated needs by providing improved battery components, improved batteries made therefrom, and methods of making and using the same.

A battery cathode composition is provided comprising core-shell composites. Each of the composites may comprise a sulfur-based core and a multi-functional shell. The sulfur-based core is provided to electrochemically react with metal ions during battery operation to store the metal ions in the form of a corresponding metal-sulfide during discharging of the battery and to release the metal ions from the corresponding metal-sulfide during charging of the battery. The multi-functional shell at least partially encases the sulfur-based core and is formed from a material that is (i) substantially permeable to the metal ions of the corresponding metal-sulfide and (ii) substantially impermeable to electrolyte solvent molecules and metal polysulfides.

In some designs, at least a portion of the composites may be formed with a substantially spherical, particle morphology of the core and shell. In other designs, at least a portion of the composites may be formed with a substantially planar, flake morphology of the core and shell. At least a portion of the substantially planar, flake morphology composites may be aggregated together into a three-dimensional agglomeration, for example. In addition, at least a portion of the composites may be formed with external open channel pores, external to the shell in relation to the core, that extend from an outer edge of the composite towards the core. The open channel pores provide channels for faster diffusion of the metal ions from outside of the composite into the core by reducing the average diffusion distance of the metal ions within the composite.

In some designs, at least a portion of the composites may have electrically interconnected sulfur-based cores. That is, at least one layer of their corresponding shells may only partially encase the interconnected sulfur-based cores, rather than fully encase them. In this way, the electrical interconnectivity may be maintained between the individual sulfur-based cores while the at least one layer substantially conformally covers a majority of the interconnected cores.

In some designs, the sulfur-based core may comprise pores mixed in with the sulfur material. In other designs, the sulfur-based core may comprise a dense metal-sulfide, which may in some cases comprise individual nano-sized or micro-sized grains of metal-sulfide linked together with a metal-ion-conductive material. The sulfur-based core may also comprise conductive carbon provided to enhance electrical conductivity. The conductive carbon may be provided, for example, in the form of carbon nanoflake(s), graphene segment(s), multi-layered graphene segment(s), graphite ribbon(s), carbon nanotube(s), nanostructured dendritic carbon, nanoporous carbon, carbon black particle(s), carbon onion particle(s), fullerene(s), and/or carbon nanofiber(s).

The material from which the multi-functional shell is formed may comprise at least one material selected from the group consisting of (i) a metal-ion-conductive ceramic coating, (ii) a polymer coating, (iii) an electrically-conductive carbon coating, and (iv) a semiconductor coating. In some designs, the material from which the multi-functional shell is formed may comprise a composite coating of two or more of these materials. The composite coating materials may be arranged in an interpenetrating configuration such that at least two of the composite coating materials contact the sulfur-based core, or alternatively, in a layered configuration such that at least one of the composite coating materials does not contact the sulfur-based core. In addition, the material from which the multi-functional shell is formed may comprise at least one material selected to electrochemically react with the metal ions during battery operation to store the metal ions in the shell during discharging of the battery and to release the metal ions from the shell during charging of the battery.

A battery cathode composition of the type described herein may be incorporated into a battery, with the material from which the shell is formed remaining (i) substantially permeable to the metal ions of the corresponding metal-sulfide and (ii) substantially impermeable to electrolyte solvent molecules and metal polysulfides during battery operation (e.g., over a substantial number of cycles).

A method of producing a battery cathode composition is also provided. The method may comprise, for example, forming a sulfur-based core and at least partially encasing the sulfur-based core with a multi-functional shell to form core-shell composites. The sulfur core is provided to electrochemically react with metal ions during battery operation, whereby the electrochemical reaction stores the metal ions in the form of a corresponding metal-sulfide during discharging of the battery and releases the metal ions from the corresponding metal-sulfide during charging of the battery. The shell may be formed from a material that is (i) substantially permeable to the metal ions of the corresponding metal-sulfide and (ii) substantially impermeable to electrolyte solvent molecules and metal polysulfides.

According to various embodiments, certain methods may further comprise dispersing core-shell composites in a binder solution, applying the dispersion of core-shell composites to a conductive metal substrate, and air or vacuum drying the metal substrate to yield a substantially uniform coating of core-shell composites bonded with a binder on the metal substrate. Other methods may further comprise dispersing core particles in a binder solution, applying the dispersion of core composites to a conductive metal substrate, air or vacuum drying the metal substrate to yield a substantially uniform coating of core particles bonded with a binder on the metal substrate, and depositing the multi-functional shell in a substantially conformal coating to at least partially encase the sulfur-based cores and form the core-shell composites. The at least partially encasing may comprise depositing the multi-functional shell by a vapor deposition method, such as chemical vapor deposition, atomic layer deposition, or thermal decomposition of precursor molecules in a gas phase.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

As discussed in the background above, there remains a need in the art for better addressing the low electrical and ionic conductivity as well as physical instability of sulfur-based cathodes in metal-ion batteries. The present disclosure accordingly provides or otherwise facilitates the fabrication and use of improved composite materials comprising sulfur or sulfur-based compounds for metal-ion battery cathodes, improved metal-ion batteries made therefrom, and methods of making and using such components and devices. In this way, a more full realization of the positive attributes of sulfur electrochemistry in metal-ion batteries, improved development of advanced sulfur cathodes, and improved development of advanced metal-ion batteries may be achieved.

Figure 1:
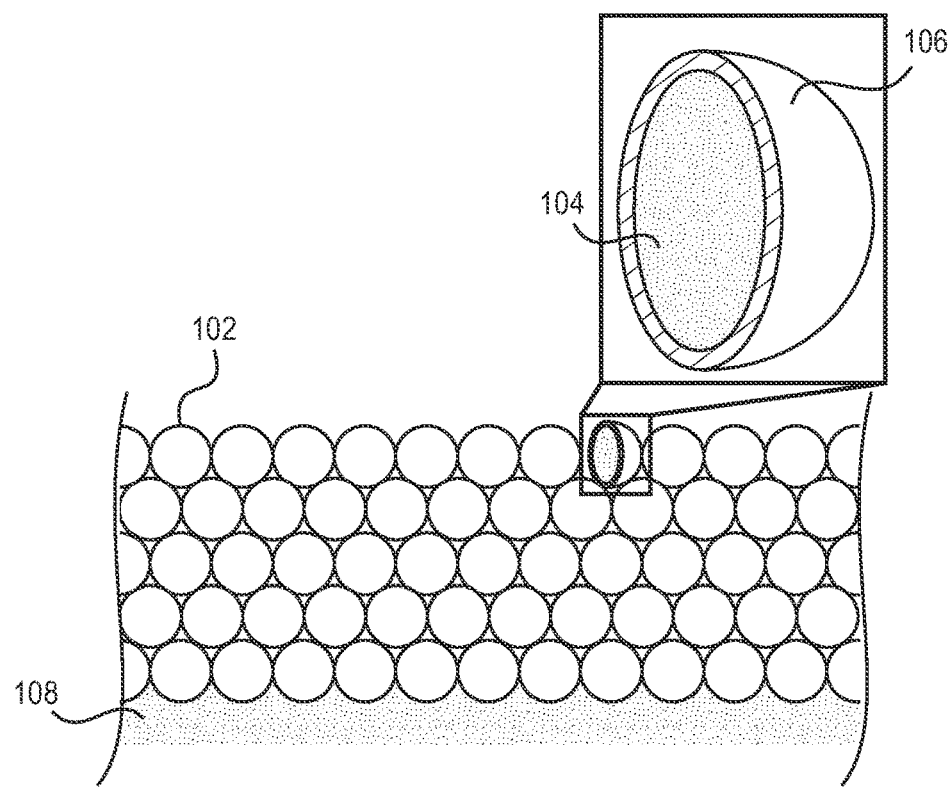
FIG. 1 illustrates an example battery cathode material composition comprising core-shell composites according to one embodiment.

FIG. 1 illustrates an example battery cathode material composition comprising core-shell composites according to one embodiment. As shown, each of the composites 102 comprises a sulfur-based core 104 and a multi-functional shell 106 that at least partially encases the sulfur-based core 104, forming a so-called "core-shell" structure. The sulfur-based core 104 is provided to electrochemically react with metal ions during battery operation to store the metal ions in the form of a corresponding metal-sulfide during discharging of the battery and to release the metal ions from the corresponding metal-sulfide during charging of the battery. The multi-functional shell 106 is formed from a material that is (i) substantially permeable to the metal ions of the corresponding metal-sulfide, such as Li, Na, Mg, Al, K, or Ca, and (ii) substantially impermeable to electrolyte solvent molecules and metal polysulfides.

In some designs, the material or a portion thereof from which the multi-functional shell 106 is formed may also be selected to be electrically conductive. In some further designs, the material may be selected to additionally be able to store the metal ions of the corresponding metal-sulfide during discharging (or more generally, during metal-ion insertion) and release them during charging (or more generally, during metal-ion extraction), while remaining impermeable to the solvent molecules and the metal polysulfides. In this case, the multi-functional shell 106 not only protects the sulfur-based core 104 from dissolution, but also stores metal ions itself, thereby increasing the total amount of metal ions that can be stored in an electrode during battery operation.

Suitable degrees of permeability and impermeability may be assessed, for example, based on relative average diffusion coefficients (diffusivities). For example, it may be desirable that the average diffusivity $D(M)$ of the metal ions through the multi-functional shell 106 be larger than the average diffusivity $D(solv)$ of the electrolyte solvent molecules by a factor 100, a factor of 1000, or even a factor of 10,000, according to various designs. Similarly, it may be desirable that that the average diffusivity $D(M)$ of the metal ions through the multi-functional shell 106 be larger than the average diffusivity $D(MPS)$ of the corresponding metal polysulfides by a factor 100, a factor of 1000, or even a factor of 10,000, according to various designs.

A cathode may be formed to take advantage of such core-shell structures by coating a metal substrate 108 (e.g., aluminum foil) with the composites 102 and a polymer binder (not shown) from a suspension of such particles in a binder solution. Air or vacuum drying may be used to yield a uniform, dry coating of the polymer-bonded core-shell composites 102 on the surface of the metal substrate 108. Alternatively, the composites 102 can be mixed or decorated or coated with a polymer binder and deposited on the metal substrate 108 without any solvents using a dry powder coating system. In some cases, the coated powder can be compressed (calendared) to achieve higher packing density. In some cases, the coated powder may be exposed to UV light or heated to induce cross-linking of the polymer. The substrate 108 can then be rolled and incorporated as a cathode in an energy storage device, such as a primary or secondary metal-ion battery (e.g., Li-ion, Na-ion, Mg-ion, Al-ion, K-ion, or Ca-ion batteries).

As explained in more detail below, this new sulfur-based cathode design has the ability to substantially alleviate the problems of sulfur cathode dissolution, low ionic conductivity, and low electrical conductivity associated with conventional sulfur-based cathodes in metal-ion batteries. Additional improvements in performance and stability may also be achieved by using polymeric binders capable of metal-ion transport but also impermeable to electrolyte solvents.

Figure 2:
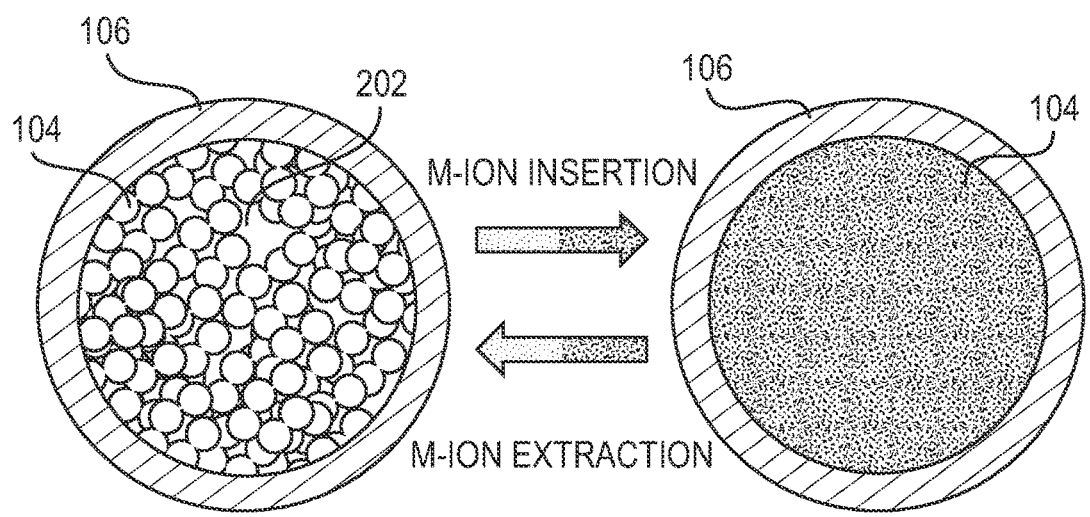
FIG. 2 illustrates metal-ion insertion and extraction from a core-shell composite during battery operation.

FIG. 2 illustrates metal-ion insertion and extraction from a core-shell composite during battery operation. In this design, the sulfur-based core 104 is composed of porous sulfur nanoparticles having a network of pores 202. This "porous" design allows the sulfur-based core 104 to accommodate metal-ion (e.g., Li-ion) insertion/extraction while allowing the overall particle size to remain constant and the multi-functional shell 106 to remain intact. Maintaining particle size during battery operation helps minimize the sulfur-based cathode degradation problem.

The pores 202 can be interconnected or isolated, as is further illustrated in FIG. 2. In addition, the composite's nano-scale size (e.g., about 20-2,000 nm in diameter) reduces the metal diffusion distance, while its near-spherical shape enables a high electrode packing density, electrode uniformity, and minimal surface area (per unit volume for a given particle size) to reduce undesirable side reactions. These combined measures offer high cathode capacity, a high degree of active material utilization and material loss prevention, and fast charge/discharge kinetics for the battery.

In order to enhance the electrical conductivity within individual composites and in order to enhance the long-term stability of the core, particularly for composites larger than 50 nm, a conductive additive (e.g., a conductive carbon of nano-sized dimensions, preferably forming an electrically interconnected carbon network) can be additionally incorporated in the sulfur-based core.

Figure 3:
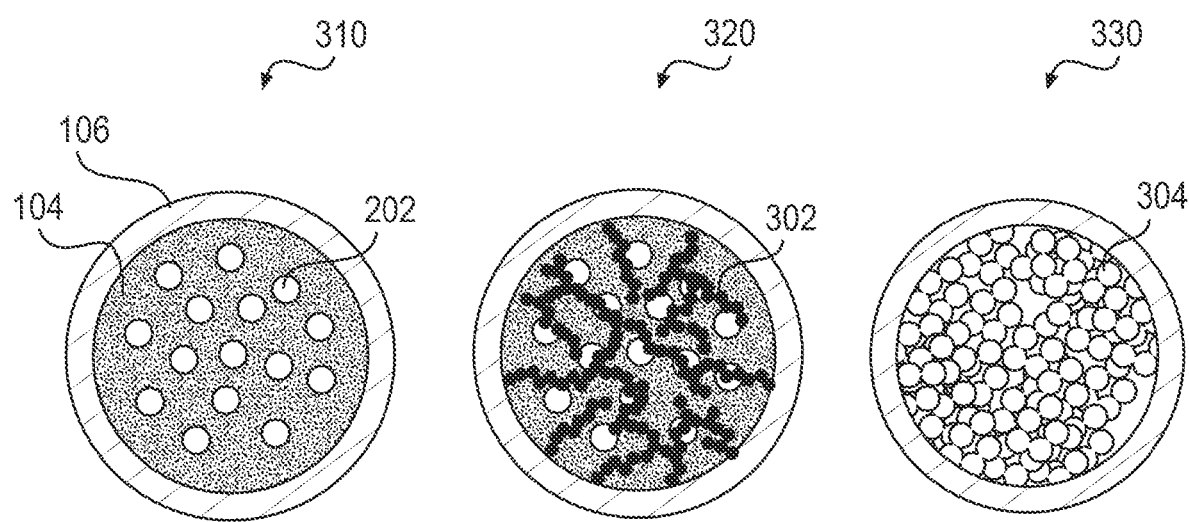
FIG. 3 illustrates several examples of a core-shell internal structure with and without conductive additives.

FIG. 3 illustrates several examples of a core-shell internal structure with and without conductive additives. As shown, the conductive additives can be incorporated, for example, as separate nanostructures within the core, such as smaller carbon nanoflakes, graphene segments, short carbon nanotubes, segments or particles of nanoporous carbon (e.g., with pores in the range of about 0.3 to 10 nm), small carbon black particles, carbon onions, fullerenes, dendritic carbon, porous carbon, small carbon nanofibers, etc., or as a thin coating (e.g., disordered but electrically conductive carbon) around individual sulfur nanoparticles comprising the porous sulfur core. In particular, structure 310 illustrates a porous sulfur-based core 104 without any conductive additives. Structure 320 illustrates a porous sulfur core 104 with a conductive carbon additive provided as separate nanostructures 302 from the internal nanoparticles. Structure 330 illustrates a porous sulfur core 104 with a conductive additive provided as a coating 304 around individual sulfur nanoparticles. Alternatively, the carbon additive in the core may be in the form of a single porous particle with interconnected pores at least partially filled with sulfur.

The carbon additives in the core additionally provide structural reinforcement of the composite structure and assist in maintaining constant dimensions during metal ion transport to/from the core from/to the electrolyte. In some designs, particles or nanostructures other than carbon can provide structural reinforcement of the composite structure and assist in maintaining the constant dimensions during electrode fabrication and/or during metal ion transport to/from the core from/to the electrolyte during the battery operation.

In some applications, it may be advantageous to use relatively large diameter composites 102 (e.g., about 300 nm to about 20 μm). Larger sized composites are easier to handle. However, the metal ion diffusion distances become large. Since the average diffusion time is proportional to a square of the diffusion distance, larger diffusion distances lead to slower metal ion insertion and extraction, and ultimately to poorer power performance of the cathode employing such composites. To enhance the ionic conductivity and power performance of larger composites, in some designs, so-called open or external "channel" pores may be introduced.

Figure 4:
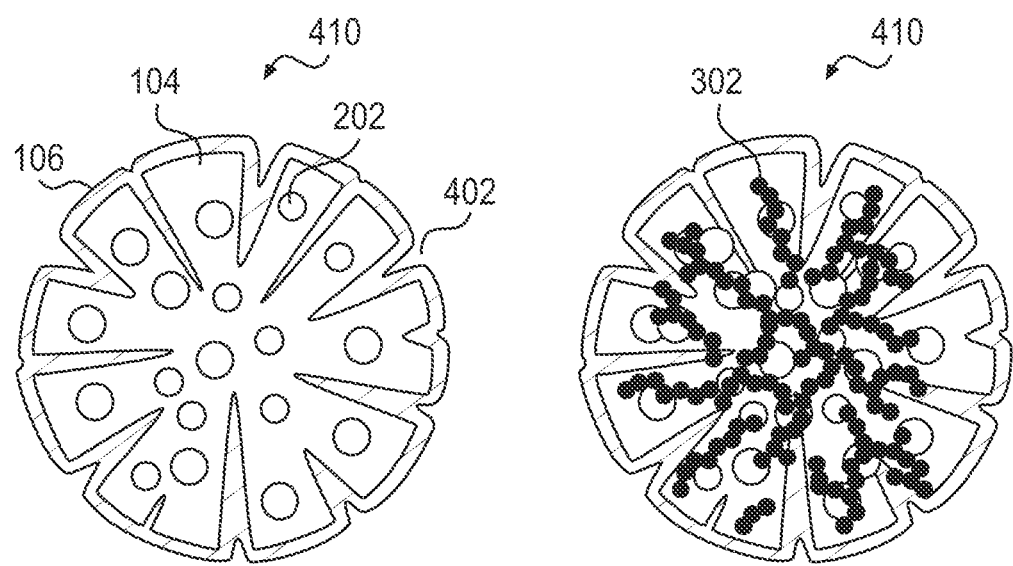
FIG. 4 illustrates several examples of large composites with open channel pores.

FIG. 4 illustrates several examples of large composites with open channel pores. As shown, open pores 402 may be introduced into the composite structure to provide ion channels with reduced average diffusion distances from the electrolyte to the center of the core 104. The open channel pores 402 may be introduced into any of the composite structure variants herein. Structure 410, for example, illustrates a composite 102 having internal (closed for electrolyte solvent access) pores 202 in addition to the external open pores 402, while structure 420, as another example, illustrates a composite 102 having internal closed pores 202 and conductive additives 302 in addition to the external open pores 402. As is further illustrated, the dimensions of the external open channel pores 402 may vary, generally, for example, from about 0.5-100 nm, or more preferably, from about 1-10 nm. Furthermore, it may be advantageous that the open pores 402 occupy less than about 35% of the overall composite volume, or even less than about 15% of the overall composite volume. As shown, the walls of the open pores 402 may be coated with various multifunctional shells 106, as desired.

Turning to the composition of the multi-functional shell 106, the multi-functional shell can be made of, for example, (1) metal-ion-conductive ceramics (e.g., oxide based, oxy-fluoride based, fluoride based, phosphate based, iodide based, or different materials comprising a metal oxide or fluoride or phosphate or iodide), (2) metal-ion-conductive polymers, (3) a metal-ion-conductive, electrically-conductive carbon (e.g., $sp^2$-bonded carbon), or (4) a semiconductor material such as silicon. It is important that the shell remains largely impermeable to the electrolyte solvent during battery operation (i.e., during battery charge, storage, and discharge) and therefore does not produce defects or pores during battery operation. In some designs, the material from which the multi-functional shell 106 is formed may comprise a composite coating of two or more of the above materials, in a number of different arrangements and configurations. In some designs, the multi-functional shell 106 can be a composite of two or more structurally and/or chemically different materials, in which at least one material is permeable by metal ions and forms continuous channels within the shell through which ion transport may take place.

Figure 5:
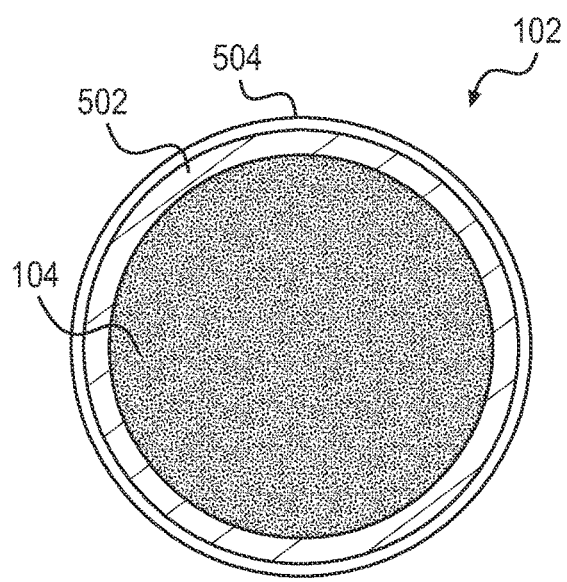
FIG. 5 illustrates an example multi-functional shell structure composed of multiple layers.

FIG. 5 illustrates an example multi-functional shell structure composed of multiple layers. Each of the layers 502, 504 may have its own composition. For example, in one design, the shell may be composed of a first layer 502 made of metal-ion-conductive ceramics, surrounded by a second layer 504 of electrically conductive carbon. In another design, the shell may be composed of a first layer 502 made of carbon surrounded by a second layer 504 of an ionically conductive polymer (e.g., conductive of Li+ ions in the case of a Li or Li-ion battery). In still other designs, the shell can comprise various layered combinations of metal-ion-conductive ceramics, metal-ion-conductive polymers, carbon, and/or semiconductors.

In the illustrated design, the composite coating materials are arranged in a layered configuration such that at least one of the composite coating materials does not contact the sulfur-based core. However, in other multi-material, composite coating designs, the composite coating materials may be arranged in an interpenetrating configuration such that at least two of the composite coating materials contact the sulfur-based core. In some designs, it has been found advantageous for the multi-functional shell 106 to contact 20% or more of the core 104 external surface, and even more advantageous for the multi-functional shell 106 to contact 60% or more of the core 104 external surface.

Figure 6:
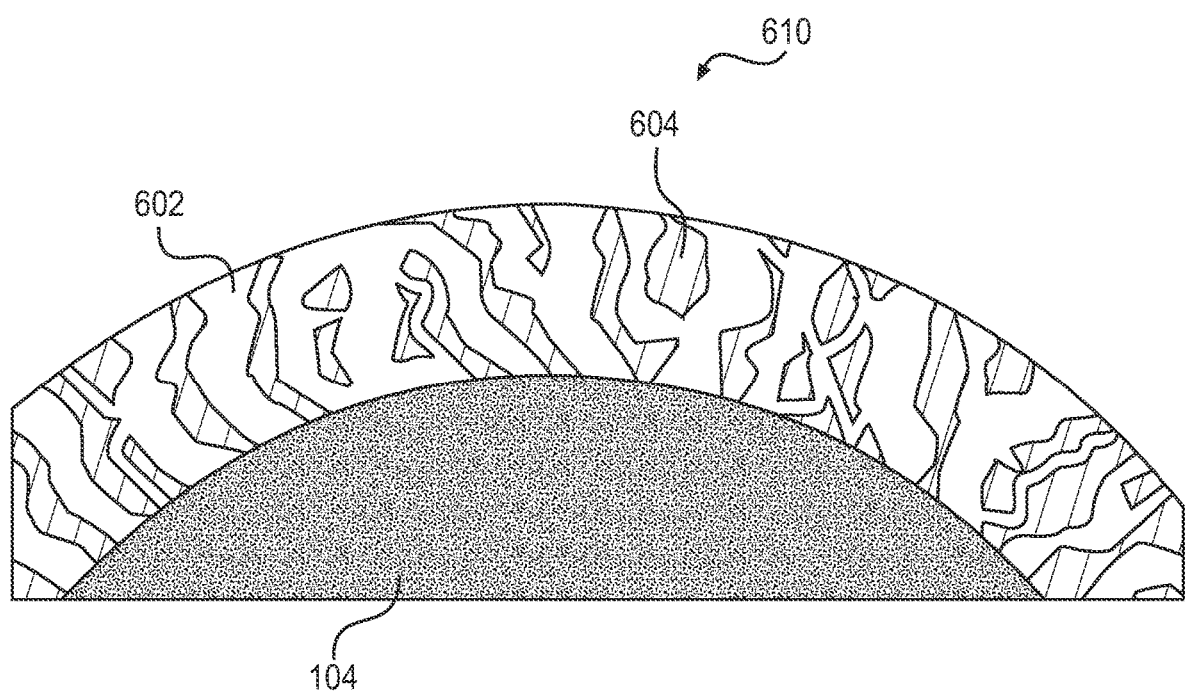
FIG. 6 illustrates an example multi-functional shell structure composed of multiple interpenetrating materials.

FIG. 6 illustrates an example multi-functional shell structure composed of multiple interpenetrating materials. In particular, a partial cross-section of an example composite structure 610 of this type is shown with a multi-functional shell composed of a porous skeleton 602 and a pore filler 604 interpenetrating the porous skeleton 602. The porous skeleton 602 may be configured to provide structural integrity, while the pore filler 604 may fill the pores of the skeleton 602 in such a way so as to suppress the transport of, for example, polysulfides though the multi-functional shell. In some designs, the porous skeleton 602 may comprise electrically conductive carbon, for example, with its pores being completely filled with another material selected for the pore filler 604 that is impermeable to, e.g., lithium sulfides. This interpenetrating structure is particularly attractive when one of the materials has a significantly higher electrical conductivity than the other material, such that the total electrical resistance of the multi-functional shell may be minimized. Similarly, the interpenetrating structure is also particularly attractive when one material has a significantly higher ionic conductivity than the other material, such that the total ionic resistance of the multi-functional shell may be minimized.

The filler material 604 may comprise, for example, metal-ion-conductive ceramics (e.g., oxide based, oxy-fluoride based, fluoride based, phosphate based, iodide based, or different metals comprising metal oxide or fluoride or phosphate or iodide) or metal-ion-conductive polymers. In some cases, the filler material need not be ionically conductive and the ion transport may take place through the skeleton material. While this lack of ionic conductivity of either the filler or skeleton material may be disadvantageous in some applications requiring more rapid ion transport (e.g., high-power batteries), the overall ionic conductivity through the composite shell may be sufficient for other applications (e.g., low- or moderate-power batteries).

One advantage of using a conductive porous skeleton within the multi-functional shell is that the shell may remain electrically conductive despite containing an electrically isolative filler material. Another advantage is better mechanical integrity. Another advantage is the additional flexibility during synthesis of the core-shell sulfur-based composites. For example, in this way the sulfur-based core material can first be infused inside the porous skeleton shell and then the pores in the skeleton can be filled with a metal sulfide-impermeable filler material.

Returning to FIG. 1, in some applications, it may be advantageous to deposit or produce the multi-functional shell 106 (or at least one of the components thereof) after depositing the sulfur-based cores 104 on the surface of the metal substrate 108. In this way, at least a portion of the composites 102 can be made to have interconnected sulfur-based cores 104, with their corresponding shells 106 only partially encasing the interconnected sulfur-based cores 104.

Figure 7:
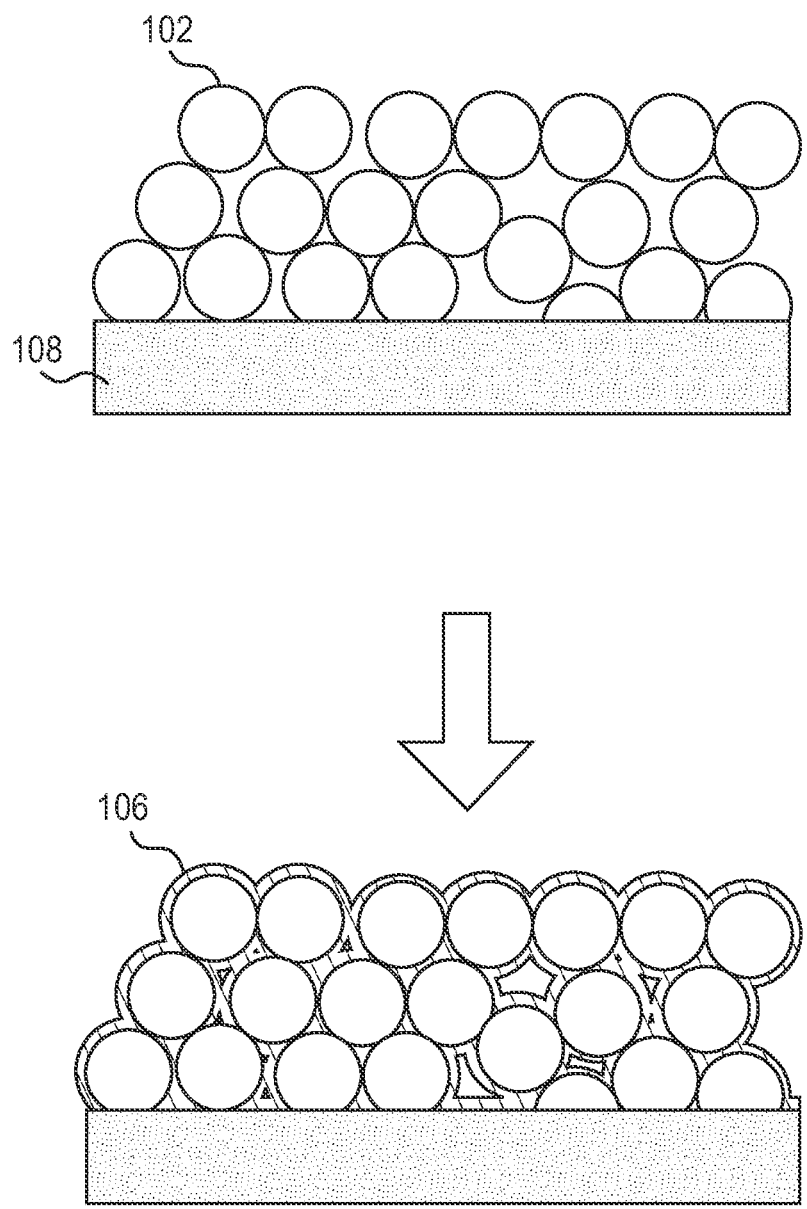
FIG. 7 illustrates an example electrode design with interconnected sulfur-based cores.

FIG. 7 illustrates an example electrode design with interconnected sulfur-based cores. In this design, because the sulfur-based cores 104 are electrically connected when deposited on the surface of the metal substrate 108, the subsequent deposition of an electrically insulating material as the shell 106 or an electrically insulating component of the shell 106 does not reduce the electrical connectivity between the individual composites 102. Good electrical connectivity of the composites within the electrode is important for their application in high-power batteries, for example.

In addition to the porous designs discussed above, the sulfur-based core may alternatively be composed, for example, of a fully encapsulated, densely packed metal-sulfide (MRS). Denser metal-sulfide cores may be advantageous in certain applications for a number of reasons. They have higher density, which leads to higher volumetric capacity and energy density. The pores shown in FIGS. 2-4, for example, may be of insufficient volume, which may lead to the breakage of the composites or the multi-functional shell during metal ion insertion. Alternatively, the pores may be of too high volume, which will reduce the volumetric performance of the composites. Metal sulfides have better mechanical strength than porous sulfur, which is important during electrode fabrication since the breakage of the core-containing particles is highly undesired and may lead to inferior properties and inferior stability of the battery electrodes. Metal sulfides additionally exhibit higher temperature stability than sulfur. Similar to sulfur, metal sulfides provide for the formation of composites that are stable in organic or ionic liquid (IL) electrolytes. But in contrast to sulfur, metal sulfides can be used together with metal-free anodes, such as Li-free graphite anodes for Li batteries or anodes comprising materials which form electrochemical alloys with Li (e.g., Si, Sn, Ge, Mg, and others) for Li batteries. Composite volume changes may accordingly be reduced during battery operation (i.e., metal-ion insertion/extraction), since the composites begin with metal incorporated into the sulfur-based core. Since the formation of pores is no longer needed within the core, these designs are also simpler to manufacture.

The use of metal-sulfides allows production of high quality, structurally stable, more precisely tuned multi-functional shells at higher temperatures. For comparison, the melting point for sulfur is approximately 113° C. while the melting point for $Li_2S$ is approximately 938° C. High temperature chemical vapor deposition (CVD), sol-gel, and annealing techniques, for example, can be used to optimize ion transport through the shell, electrical conductivity of the shell, and other physical, chemical, or mechanical properties of the shell.

Figure 8A:
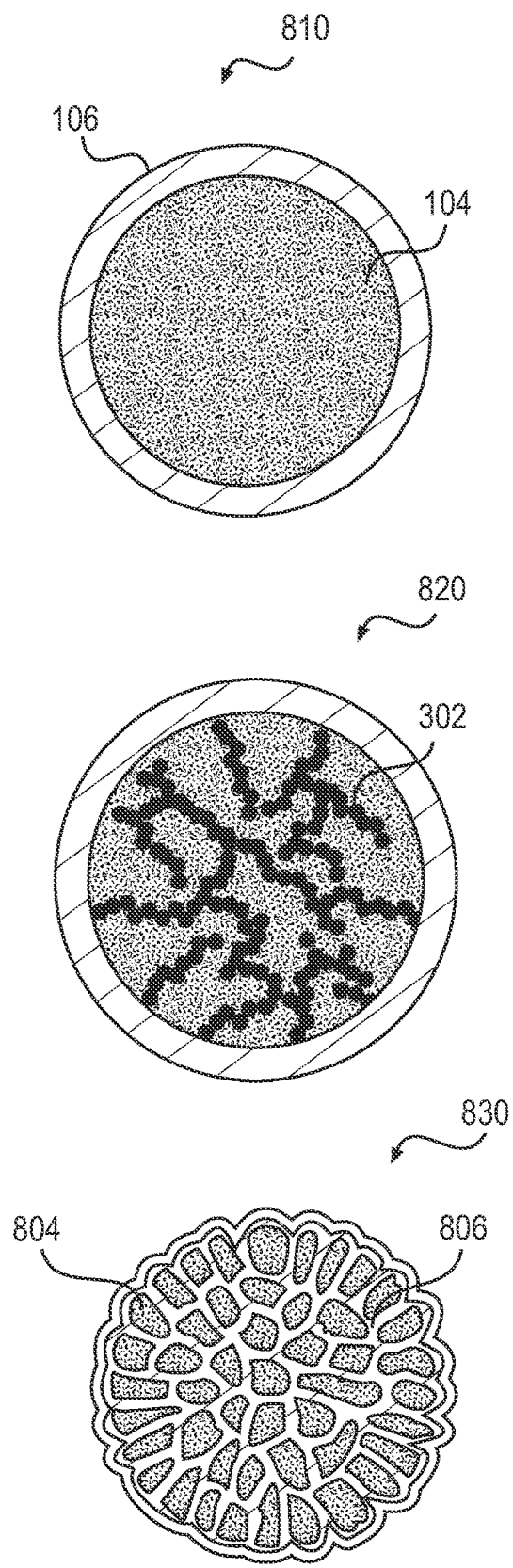
FIGS. 8A-8B illustrate several example designs in which the sulfur-based core is composed of a dense metal-sulfide, both with and without conductive additives, and with and without external open channel pores.
Figure 8B:
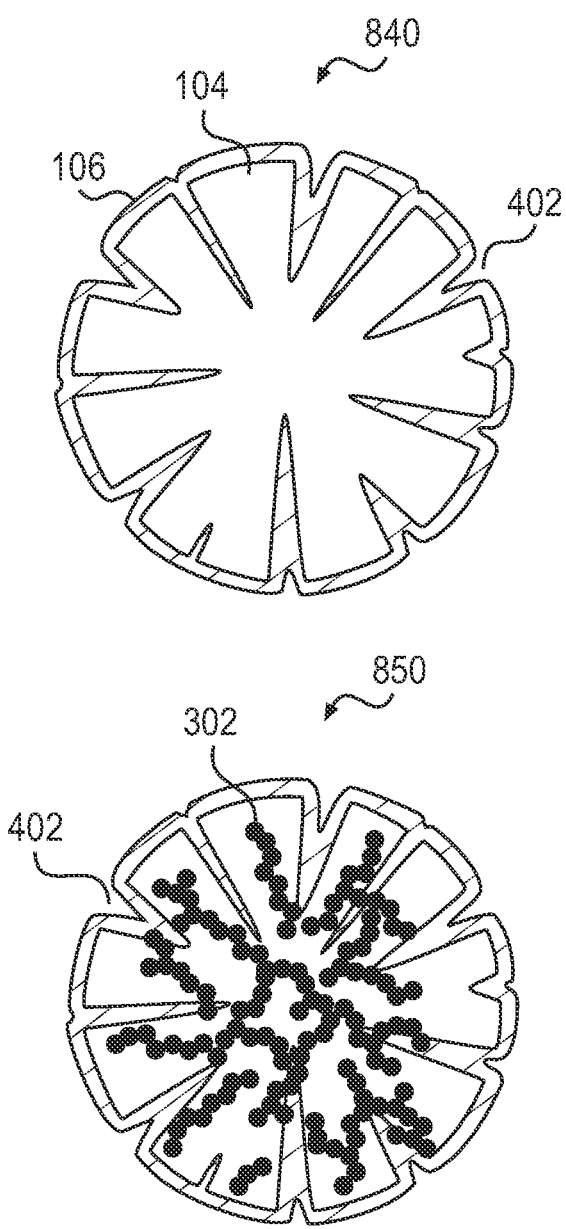

FIGS. 8A-8B illustrate several example designs in which the sulfur-based core is composed of a dense metal-sulfide, both with and without conductive additives, and with and without external open channel pores. In particular, structure 810 illustrates a dense metal-sulfide as the core 104 without any conductive additives. Structure 820 illustrates a metal-sulfide as the core 104 with a conductive carbon additive provided as separate nanostructures 302 from the sulfur nanoparticles 102, similar to structure 320 discussed above with reference to FIG. 3. As discussed above, such conductive additives can be incorporated, for example, as separate nanostructures within the core in a variety of ways, such as using smaller carbon nanoflakes, graphene segments, short carbon nanotubes, carbon onions, fullerene, multi-layered graphene segments, graphite ribbons, small carbon black particles, small carbon nanofibers, etc.

In some designs it may be advantageous to have electrically interconnected conductive carbon additives to enhance the electron transport rate within the core. In structure 830, the metal-sulfide core comprises individual nano-sized or micro-sized grains 804 of metal-sulfide linked together with a metal-ion-conductive material 806. The metal-ion-conductive material 806 may also be electrically conductive in some designs.

The structure 840 is of a larger diameter design (e.g., with a diameter in the range of about 200 nm to 20 µm) and contains open channel pores 402 (e.g., sized in the range of about 0.5 to 100 nm, preferably in the range of about 1 to 10 nm). As discussed above, the open channel pores 402 reduce the average ion diffusion distance. The structure 850 is similar to the structure 840, but additionally contains conductive additives 302 within the metal sulfide core. It will be appreciated that the metal-sulfide core designs can be formed with any of the shell structures or core interconnectivities described herein, as desired.

In still other designs, the carbon additive in the core may be in the form of a single porous particle with interconnected pores at least partially filled with sulfur. As discussed above, the carbon additives in the core additionally provide structural reinforcement of the composite structure and assist in maintaining constant dimensions during metal ion transport to/from the core from/to the electrolyte. In some designs, particles or nanostructures other than carbon can provide structural reinforcement of the composite structure and assist in maintaining the constant dimensions during electrode fabrication and/or during metal ion transport to/from the core from/to the electrolyte during the battery operation.

According to various embodiments, the core-shell composites can be fabricated in different architectural forms, including, for example, a core-shell powder in which the composites are near-spherical or core-shell flakes or nano-flakes (or aggregates thereof) in which the composites have a more planar morphology. FIG. 1 shows one design in which the composites 102, in the illustrated example, are formed with a substantially spherical, nanopowder morphology of the core and shell. However, other designs and morphologies may be advantageous in certain applications.

Figure 9:
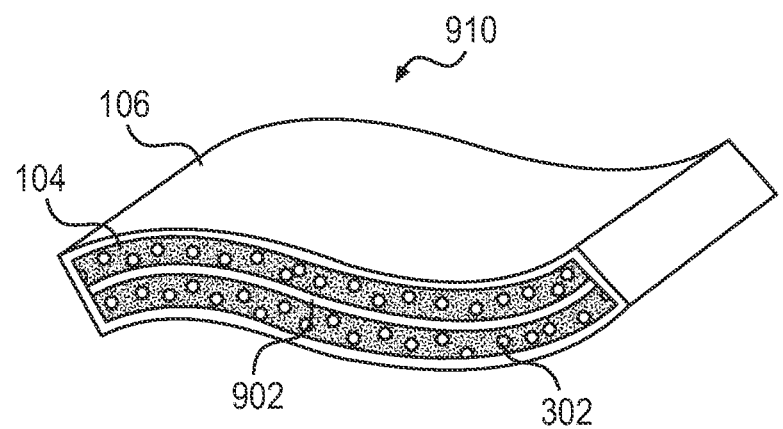
FIG. 9 illustrates designs in which the composites are formed with a substantially planar, flake morphology of the core and shell.
Figure 9:
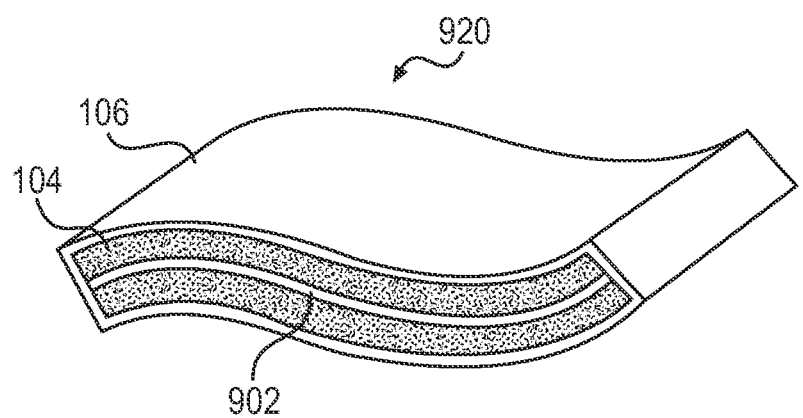
Figure 9:
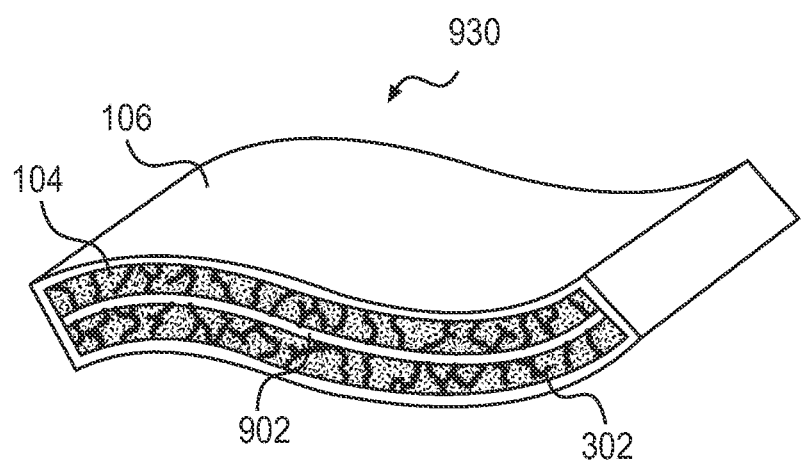

FIG. 9 illustrates other designs in which the composites are formed with a substantially planar, flake morphology of the core and shell. As shown, core-shell flakes with both porous sulfur and dense metal-sulfide cores can be formed in this way. In particular, structure 910 illustrates a porous sulfur material as the core 104 while structure 920 illustrates a dense metal-sulfide material as the core 104. In either case, the sulfur core 104 may be constructed around a 2D backbone 902 (e.g., multi-layer graphene) to provide the substantially planar, flake morphology. As discussed above, the porous sulfur or metal-sulfide core accommodates metal insertion/extraction, allowing overall composite size to remain constant and the multi-functional shell 106 to remain intact. The further illustrated structure 930 shows an example sulfide core 104 with a conductive additive 302. As with the nanopowder designs above, conductive additives can be added to the core in the form of smaller carbon nanoflakes, graphene segments, short carbon nanotubes, small carbon black particles, small carbon nanofibers, activated carbon, microporous carbon, mesoporous carbon, etc. It will be further appreciated that the flake designs can be formed with any of the shell structures or core interconnectivities described herein, as desired.

The planar morphology provides several key advantages in terms of power capabilities. Planar particles offer higher electrical conductivity due to larger area contacts and the ability to propagate all the way from the current collector to the surface of the electrode. The higher surface area (per unit volume) of the planar particles reduces the thickness of the sulfur-based core, which helps to mitigate sulfur's low electrical and ionic conductivities. Particle swelling during metal insertion/extraction due to insufficient porosity and other defects of the sulfur-containing core can also be accommodated. The presence of the planar backbone 902 helps preserve the integrity of the top and bottom surface area of the multi-functional shell 106, limits shell damage to the small fraction of surface area at the edges of the flake particle, and thus minimizes exposure to electrolyte solvent.

Figure 10:
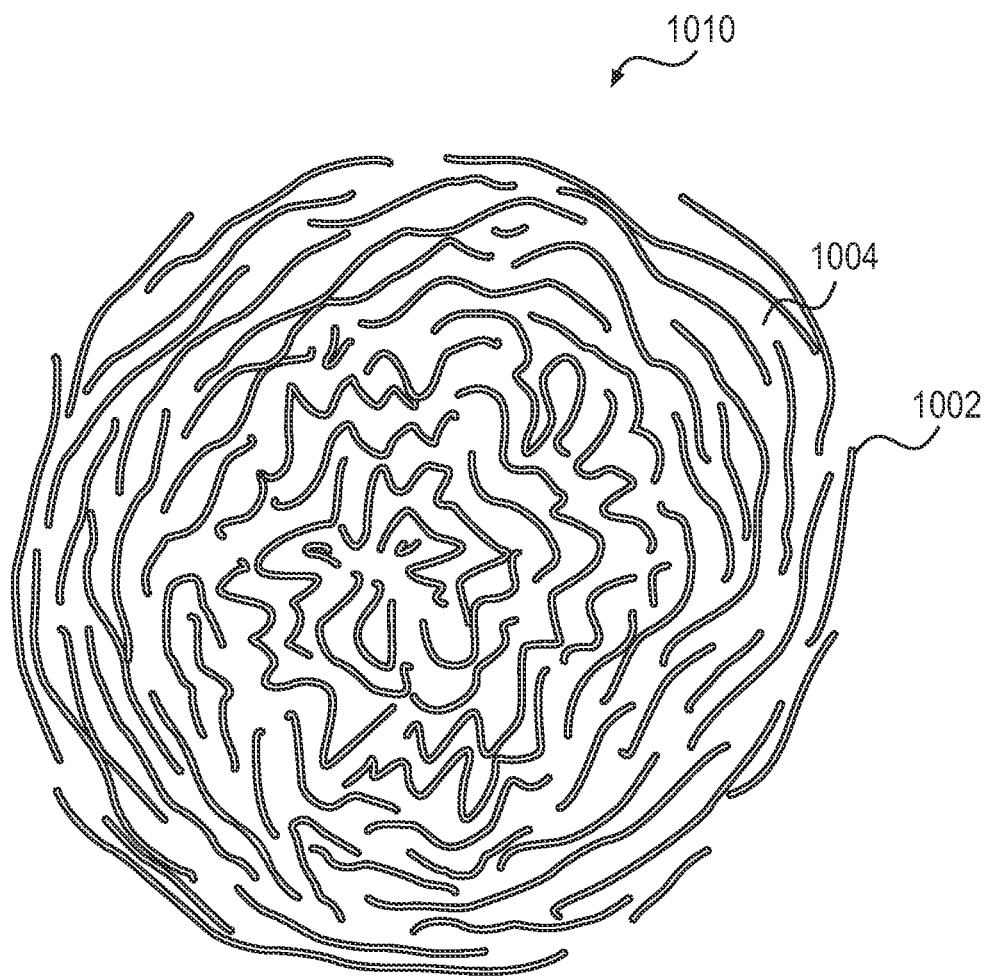
FIG. 10 illustrates an example three-dimensional agglomerate structure formed from substantially planar, flake morphology composites.

FIG. 10 illustrates an example three-dimensional agglomerate structure formed from substantially planar, flake morphology composites. In this example, the three-dimensional agglomerate structure 1010 includes a plurality of flake composites 1002 with pores or voids 1004 therebetween, and is shaped as a generally spherical granule. It will be appreciated, however, that other shapes may be created as desired for a particular application, such as an ellipse, an ellipsoid, a rod, or other shapes. It will further be appreciated that while terms like "spherical" and "ellipsoidal," for example, are used to describe the shape of such a three-dimensional structure, these terms are not intended to convey or in any way require that the agglomerates take on a mathematically precise geometric figure. These terms are only used to convey the general shape for illustration purposes. It will be appreciated that, in practice, the three-dimensional agglomerate structure 1010, for example, may simply be substantially round, and not precisely spherical or even ellipsoidal.

Various methods can be used to form the sulfur-based core and the multi-functional shell, examples of which are described in detail below. In these examples, it will be appreciated that care should be taken to ensure compatibility between the particles to be coated and the protective coating, as well as the deposition process used (i.e., the coating synthesis conditions should not destroy the particles due to temperature, chemical dissolution, etc.).

Figure 11:
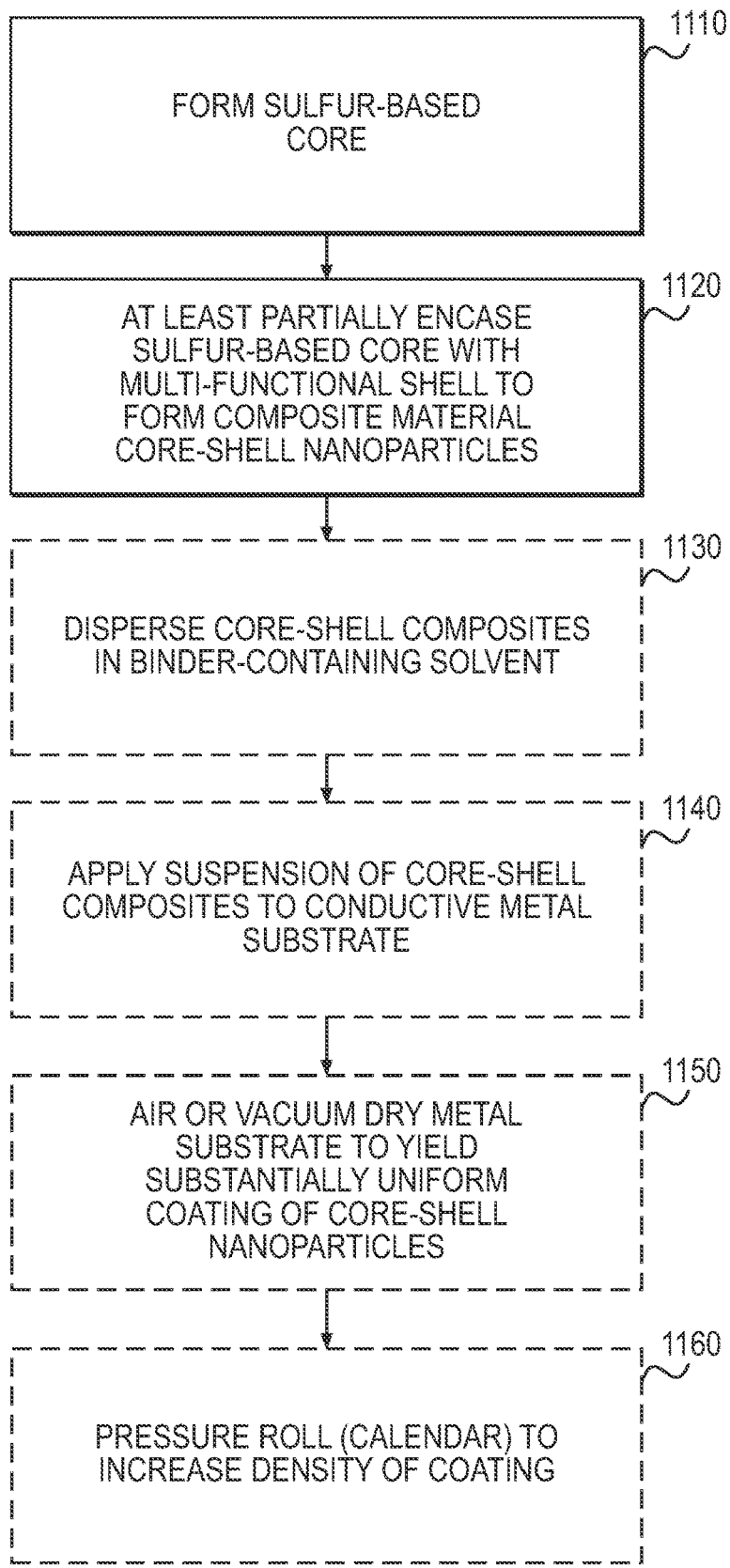
FIG. 11 is a flow diagram of an example method of producing a battery cathode composition according to various embodiments herein.

FIG. 11 is a flow diagram of an example method of producing a battery cathode composition according to various embodiments herein. As shown a sulfur-based core is formed for electrochemically reacting with metal ions during battery operation (block 1110). As discussed above, the electrochemical reaction stores the metal ions in the form of a corresponding metal-sulfide during discharging of the battery and releases the metal ions from the corresponding metal-sulfide during charging of the battery. The sulfur-based core is then at least partially encased with a multi-functional shell to form core-shell composites (block 1120). The shell is formed from a material that is (i) substantially permeable to the metal ions of the corresponding metal-sulfide and (ii) substantially impermeable to electrolyte solvent molecules and metal polysulfides.

At the appropriate time, the resultant battery cathode composition may be formed into a cathode. This may be achieved, for example, by dispersing the core-shell composites in a solvent mixed with a dissolved polymer binder and optional conductive carbon additives (optional block 1130). The suspension of core-shell composites in the polymer binder solution may then be applied to a conductive metal substrate (optional block 1140). Subsequently, air or vacuum drying the metal substrate may be used to yield a substantially uniform coating of core-shell composites on the metal substrate, bonded (e.g., glued) together with a polymer (optional block 1150), thereby creating a battery cathode. Alternatively, the blocks 1130, 1140, and 1150 may be replaced by a dry particle deposition method to yield a substantially uniform coating of core-shell composites mixed with optional conductive additives and bonded with a polymer binder on the metal substrate. Finally, the packing density of the produced electrode can be increased by a process called calendaring or pressure-rolling (optional block 1160).

The above steps, procedures, and techniques may be practiced and supplemented in a variety of ways to achieve the various structures described herein.

In a first example, a method of forming a porous sulfur core, with or without conductive additives, using a disproportionation of thiosulfate solution will be described. Here, the synthesis of sulfur powder and nanopowder suspensions may be achieved by disproportionation of a water-based sodium thiosulfate solution ($Na_2S_2O_3$), as is known in the art. According to this process, concentrated HCl is added to a water solution of $Na_2S_2O_3$ to produce a yellow suspension of sulfur particles (sulfur sol). Other precursors can be added to the stable suspension of sulfur nanopowder to later induce uniform metal oxide or carbon coatings on their surface.

In order to produce sulfur nanoparticles of the desired morphology and size as described herein (including a porous sulfur core in this example), the growth of the primary sulfur nanoparticles may be restricted (e.g., to below about 5-10 nm) and their agglomeration induced to form porous granules of about 20-600 nm in diameter (for spherical particles), or to form thin layers of less than about 2-200 nm in thickness on each side of a planar backbone substrate (for planar particles). In the case of planar particle geometry, sulfur nanoparticles or a continuous sulfur layer may be nucleated on the surface of the planar backbone (e.g., functionalized graphene), or sulfur nanoparticles may be attached to the backbone surface. In the latter case, the carbon backbone and the sulfur nanoparticles should have opposite charges on their surface. The desired size and porosity of the sulfur-containing core can be optimally tuned by adjusting the concentration of the thiosulfate solution, adding surfactants, adjusting pH of the solution and using acids other than HCl, or varying the temperature during synthesis.

Introduction of functionalized conductive additives (e.g., carbon) into the solution allows formation of a porous composite composed of sulfur and conductive additives. Incorporation of organics (e.g., polysaccharides) into the solution during wet chemistry synthesis of sulfur nanoparticles creates a carbon-containing organic layer, which can then be transformed into a conductive carbon layer on the outer surface of the entire sulfur core or on the surface of individual sulfur nanoparticles making up the porous sulfur core.

Surfactants can be used to create a desired electrical charge on the surface of individual sulfur nanoparticles or agglomerates to facilitate coating with other electrically charged materials. For example, surfactants can be used to induce a positive charge on the surface of sulfur nanoparticles or agglomerates intended to be additionally coated with a polymer having negatively charged surface functional groups (e.g., polysaccharides). Subsequent exposure of the mix to elevated temperature, elevated pressure, or to a more acidic environment leads to partial decomposition of the polymer layer, forming a conductive carbon coating on the sulfur surface.

In a second example, a method of forming a porous sulfur core, with or without conductive additives, via "miniemulsion" will be described. Miniemulsion refers to nano-sized (e.g., about 20-600 nm) emulsion, prepared by emulsification of two immiscible liquids in the presence of surfactants and a third agent with low solubility in one of the liquids (often called a hydrophobe). For the preparation of sulfur nanoparticles, sulfur is converted to the liquid phase by mixing the sulfur with water, surfactant, and hydrophobe, and heating the mixture in a pressurized reactor to above the sulfur-melting temperature. The liquid phase sulfur may then be incorporated into a miniemulsion with water using ultrasound or high rate mixing. Once a stable emulsion is achieved, the mixture is cooled down to ambient temperature, yielding a suspension of sulfur nanoparticles in water. Other conductive nanoparticles can be added to the miniemulsion to form sulfur nanocomposites. Subsequently, the porous sulfur core may be formed from the sulfur nanoparticles and nanocomposites using controlled flocculation.

In a third example, a method of forming a dense metal-sulfide core, with or without conductive additives, via wet chemistry techniques will be described. For simplicity, the following description relates to the synthesis of lithium sulfide-based structures (i.e., when M=Li). However, it will be appreciated that when M=Na, Mg, Al, K, or Ca, similar approaches can be utilized.

To prepare metal-sulfide nanoparticles or other nanostructures using a wet chemistry approach, the metal-sulfide is first dissolved in water, ethanol, or another appropriate solvent. A non-solvent for $Li_2S$ that is miscible with water (e.g., acetone, etc.) is added to precipitate $Li_2S$ from the solution. After precipitation, isolation of $Li_2S$ nanoparticles may be achieved by centrifugation of the suspension and vacuum drying of the solvent residuals.

To prepare $Li_2S$ nanoparticles with conductive additives, the desired additives can be suspended in the $Li_2S$ solution. Upon non-solvent addition, suspended conductive additives serve as nucleation centers for $Li_2S$ precipitation, yielding nanoparticles consisting of metal-sulfide with conductive additives enclosed inside.

The size, size distribution, and morphology of precipitated particles can be varied by the non-solvent used, rate of non-solvent addition, application of shear forces to the solution via mechanical mixing or ultrasound, addition of surfactants, and concentration of the initial $Li_2S$ in a water solution.

In a fourth example, a method of forming a dense metal-sulfide core, with or without conductive additives, via gas phase synthesis will be described. For simplicity, the following description relates to the synthesis of lithium sulfide-based structures (i.e., when M=Li). However, it will be appreciated that when M=Na, Mg, Al, K, or Ca, similar approaches can be utilized.

To prepare $Li_2S$ nanoparticles using gas phase synthesis, a water solution of $Li_2S$ (with or without conductive additives) may be spray-dried in air. The size, size distribution, and morphology of the final nanoparticles can be controlled by varying the degree of solution atomization during spray drying, the drying temperature, and the relative concentration of components in the solution.

Synthesis of dendritic $Li_2S$ nanoparticles can be achieved by first emulsifying a water solution of $Li_2S$ in oil phase (e.g., hexane, toluene, etc.), with surfactants (non-ionic, cationic, or anionic) added for stabilization. The emulsion is then diffused through oil phase to evaporate the water and form dendrite $Li_2S$ nanoparticles. Size and morphology of the nanoparticles can be controlled by varying the initial concentration of the $Li_2S$ solution, the nature and amount of surfactant, the relative ratio of water and oil in the mixture, and rate of water evaporation from the emulsion.

In a fifth example, a method of forming a metal oxide protective coating as part of a multi-functional shell via low temperature atomic layer deposition (ALD) for sulfur-containing particles will be described. In ALD, a chemical reaction proceeds on the surface of the sulfur-containing particles to form one shell layer at a time. For each layer, one gas precursor is introduced and chemisorbed on the surface of the sulfur-containing particles. The excess gas is flushed away and another precursor gas is introduced to react with the first chemisorbed layer, creating an additional monolayer of deposited film. Since the ALD process can be performed at very low temperatures, post-treatments (e.g., annealing of produced electrodes) can be used for additional control over the produced oxide microstructure.

An example process flow for the formation of a Li-ion conductive $V_2O_5$ layer by ALD may include: $2VCl_4$ (g)+ $5H_2O$ (adsorbed vapor)$\rightarrow V_2O_5$ (s)+8HCl (g)+$H_2$ (g), or $2VO(C_3H_7)_3$ (g)+$3H_2O \rightarrow V_2O_5$ (s)+$6HOC_3H_7$ (g). Temperature, cycle time, and gas flow rate parameters can be tuned to improve the efficiency of the deposition conditions.

In a sixth example, a method of forming a metal oxide protective coating as part of a multi-functional shell via high temperature chemical vapor deposition (CVD) for metal-sulfide containing particles will be described. Deposition of oxides on any substrate can be challenging if reactive metals (e.g., Li) are used, because most organometallic precursors are very air- and moisture-sensitive, pyrophoric, and therefore must be handled with extreme care. In addition, due to limited shelf life span, precursors should be freshly synthesized prior to usage.

An example process flow for the formation of a Li-ion conductive aluminum oxide layer by CVD may include thermal decomposition of Al tri-isopropoxide at above around 220° C.: $2C_9H_{21}O_3Al$ (vapor)$\rightarrow Al_2O_3$ (solid)+6 $C_3H_7$ (g)+$C_3H_7O_3$(g). The organometallic precursor (such as Al tri-isopropoxide) vapors can be carried to the reaction site by a carrier gas, such as argon (Ar), helium (He) or even nitrogen ($N_2$). Temperature and gas flow rate parameters can be tuned to improve the efficiency of the deposition conditions.

The use of plasma enhancements for CVD or ALD processes may be advantageous in some applications. For example, plasma enhancements may allow the deposition temperature to be reduced while improving the coating microstructure and uniformity. Due to the low evaporation temperature of sulfur, plasma-enhanced (PE) PECVD and PEALD processes may allow formation of ceramic coatings (shells) at temperatures where the vapor pressure of sulfur-based core particles is sufficiently small, such as at 100° C. or even at room temperature.

The materials and deposition process used should accordingly be carefully selected. For example, the most promising organometallic precursors for ALD and CVD deposition processes should be identified (e.g., those that decompose at sufficiently low temperature, provide constant vapor pressure, and produce the highest coating quality at lowest cost) from among the many types of commercially available organometallic precursors. Lithium precursors include Li β-diketonates (freshly synthesized and sublimed), Alky-Li (such as tert-ButylLithium, stripped from a solvent), and Lithium alcoholates (such as Li-Ethanolate or Li-hexafluoroisopropoxide, freshly synthesized). Common volatile precursors for Mn (and other metals, such as V, Co, Ni, Al, etc.) include β-diketonates or alcoholates. These precursors have been successfully used for CVD of high temperature super conductors and fuel cell materials.

Different gases can be used for the deposition process, including dry oxygen ($O_2$) as a reaction gas, and argon (Ar), helium (He) or even nitrogen ($N_2$) as a carrier gas. Both hot-wall and cold-wall reactors can be used, with separate heated or cooled vaporizers to control the stoichiometry of the obtained film. Liquid delivery and/or flash vaporizers can further facilitate precursor handling and the overall deposition process. Finally, deposition conditions should be selected in such a way that reactions producing metal oxides (including lithium-containing metal oxides) primarily occur on the surface of the metal-sulfide containing nanoparticles.

In a seventh example, a method of forming a metal oxide protective coating as part of a multi-functional shell via electroless deposition and solution precipitation will be described. Metal oxide coatings can be formed via a solution precipitation method. For example, a $Mn^{2+}$ salt precursor may be added to a stable suspension of sulfur nanoparticles (or porous aggregates of sulfur nanoparticles). Over time, $Mn^{2+}$ cations are adsorbed on the sulfur surface, forming heterogeneous nucleation sites for $MnO_2$ shell growth. Permanganate $MnO_4^-$ may then be added to oxidize the $Mn^{2+}$ and produce a $MnO_2$ coating on the sulfur surface. A high concentration of nucleation sites should be achieved prior to adding permanganate $MnO_4^-$ to produce a conformal, defect-free $MnO_2$ coating. Due to the solubility of metal-sulfides (e.g., lithium sulfide) in water, methods that use water as a solvent or as a processing gas should be restricted to deposit oxide coatings on the surface of sulfur.

In an eighth example, a method of forming a metal oxide protective coating as part of a multi-functional shell via electrochemical deposition will be described. Powders and thin films of metal oxide materials can be prepared by cathodic electrosynthesis from metal salt solutions. In this method, metal ions or complexes are hydrolyzed by an electrogenerated base to form oxide or hydroxide deposits (which can be converted to corresponding oxides by thermal treatment) on cathodic substrates. Electrosynthesis of an organic phase and electrophoretic deposition of charged polymers may then be used for coating formation.

In a ninth example, a method of forming a carbon coating as part of a multi-functional shell via low temperature solution based processes will be described. The carbon coating can be formed on the surface of the sulfur-/metal-sulfide-containing core, or on the surface of other coatings around the core (e.g., oxide, oxy-fluoride, fluoride, phosphate, iodide and other coatings).

Here, conductive carbon particles (such as graphene) and sulfur particles (or sulfur particles coated with a layer of oxides, fluorides, oxyfluorides, iodides, phosphates, polymers or surfactants) may be prepared in such a way as to have opposite charge. For example, graphene can be prepared to have a negative charge on its surface while sulfur or coated sulfur particles can be prepared to have a positive charge on their surface. Mixing the suspension of positively charged sulfur or coated sulfur particles with negatively charged carbon particles induces the formation of a conductive carbon coating around the sulfur or coated sulfur particles.

The following is an example process flow for the formation of a carbon coating on the surface of a metal oxide (e.g., $MnO_2$) shell pre-deposited on the sulfur-containing core, and in particular, the synthesis of C—$MnO_2$—S core-shell nanoparticles. In this process, highly flexible and highly conductive graphene layers may be employed.

The process begins by preparing negatively charged graphene oxide (GO) via exfoliation of a natural graphite followed by ultrasonic shearing. While mechanical shearing may produce graphene of very high quality, ultrasonic treatment enables more scalable graphene production with significantly higher yield. Modifying negatively charged —OH functional groups on the $MnO_2$ shell surface may then be performed by surface grafting (e.g., of aminopropyltrimethoxysilane) to facilitate coating by positively charged —$NH_2$ groups. Mixing the suspensions of negatively charged graphene oxide particles and positively charged $MnO_2$—S particles to induce co-assembling from mutual electrostatic interactions results in the formation of a stable suspension of negatively charged GO-$MnO_2$—S particles with an ultra-thin GO coating layer. Subsequent chemical reduction of the GO with hydrazine results in graphene (carbon) encapsulated $MnO_2$—S particles. Centrifugation of the suspension may be used to isolate the produced C—$MnO_2$—S particles.

In a tenth example, a method of forming a carbon coating as part of a multi-functional shell via low temperature hydrothermal decomposition of organics in the presence of catalysts will be described. A method of this type may include the following three steps. First, the addition of a carbon precursor solution (e.g., sucrose ($C_{12}H_{22}O_{11}$)) to a suspension of sulfur nanoparticles may be performed to induce a sucrose coating of the sulfur nanoparticles. Second, hydrothermal carbonization may be performed via dehydration of the sucrose and subsequent carbonization by the addition of a catalyst (e.g., $H_2SO_4$). This process can take place at room temperature, but elevated temperatures or pressures (through the use of autoclave) can dramatically improve process kinetics. Third, centrifugation of the suspension may be performed to isolate the produced C—S particles. If metal-sulfide nanoparticles are used instead of sulfur, a water solution should not be used. Instead, a solution that is a non-solvent for metal-sulfides but a solvent for the selected organic molecules should be used.

A similar process can be used to coat metal-sulfide (e.g., $Li_2S$) or coated metal-sulfide (or sulfur or coated sulfur)

particles with a polymer that is subsequently carbonized (transformation of a polymer into an electrically conductive carbon layer). For example, metal-sulfide or coated metal-sulfide (or sulfur or coated sulfur) nanoparticles may be dispersed in an organic solvent, e.g. tetrahydrofuran (THF), which acts as a non-solvent for $Li_2S$ when polycarbonate is the polymer. Polymer is then added and dissolved in the mixture, with the ratio between the metal-sulfide or coated metal-sulfide (or sulfur or coated sulfur) nanoparticles and polymer measured to control the thickness of the final polymer coating. Polymer non-solvent (e.g., ethanol, which is a non-solvent for polycarbonate) is slowly added to precipitate the polymer onto the nanoparticles. The polymer-coated nanoparticles may be separated via sedimentation, centrifugation or filtration, and then a carbon shell may be formed by annealing the polymer coated nanoparticles at high temperatures.

In order to induce more uniform coverage of the sulfur (or coated sulfur, metal-sulfide, coated metal-Sulfide) particles with a polymer/organic layer, the particles and the polymer/organic molecules should have the opposite charge. For example, a positively charged surfactant-coated sulfur surface may be used with organic molecules that have a negative charge on their surface (e.g., polysaccharides, such as polyacrilic acid (PAA)).

In an eleventh example, a method of forming a carbon coating as part of a multi-functional shell via chemical vapor deposition (CVD) will be described. This process is more suited to metal-sulfides because it requires temperatures in excess of 350° C. This process involves thermal decomposition of organic precursors: $C_x(H_2)_y(g) \rightarrow yH_2(g) + xC(s)$. By controlling the precursor flow rate, the degree of precursor dilution in inert gas, the pressure and temperature profile in the deposition chamber, and the nature of the precursor, the mean free path of precursor diffusion into the pores can be controlled before deposition occurs. Under process conditions that limit carbon formation by a surface reaction rate rather than by precursor diffusion, uniform film deposition may be achieved. Doped carbon films can be produced by using a carbon precursor containing elements other than C and H. In some cases, however, the CVD of carbon may not be appropriate. For example, the produced $H_2$ gas may react with a metal sulfide producing hydrogen sulfides. To avoid such reactions, metal sulfide particles may be first coated with a conformal layer of metal oxides, such as aluminum oxide. Such coatings may be deposited by sol-gel, ALD, CVD, or other known methods.

In the twelfth example, a method of forming spherical porous carbon-sulfur or carbon-sulfide core composites with a diameter in the range of about 100 nm to 80 microns and pores of about 1-100 nm in size is described. First, a porous carbon scaffold is produced. A mixture of a monomer, optional porogen, and initiator in an organic solvent is dispersed in continuous phase (such as water or aqueous solution containing surfactants and polymer stabilizers) to form spherical droplets of 200 nm-80 microns in diameter. By changing a dispersion route and optimizing organic solvent/surfactant/monomer/polymer stabilizer combination, the size of the droplets may be tuned to achieve the desired average size. By the action of UV light or heat, near-spherical porous polymer particles may be produced.

After oxidation (e.g., by treatment in air or oxygen at around 200-300° C.) the polymer particles may be further stabilized. By thermal treatment of the produced polymer particles in an inert environment (such as Ar or $N_2$ or He) or in a mild oxidizing atmosphere (such as $CO_2$) spherical porous carbon particles are produced. The porogen content and chemistry in the dispersed phase will impact the size of the large-size pores (e.g., about 2-200 nm). An optional activation procedure (e.g., by exposing the produced carbon powder samples into the stream of $CO_2$ gas or steam at around 800-1000° C.) is then used to increase the pore volume and form smaller pores (e.g., about 0.5-5 nm) within the porous carbon particles.

Second, the electrically conductive porous carbon scaffold is infiltrated with sulfur or metal sulfides. In one example, sulfur (or metal sulfide) can be melt-infiltrated into the porous carbon scaffold by immersion of carbon particles into a sulfur (or metal sulfide) melt. The excess of sulfur (or a metal sulfide) from the particle surface can be removed by evaporation. The pores within the C—S composite core can similarly be formed by partial evaporation of sulfur. Alternatively, sulfur (or metal sulfide) can be introduced by dissolving it in a solvent, infiltrating the porous carbon scaffold by a sulfur- (or sulfide-) containing solution and evaporating the solvent. The repetition of this procedure multiple times may allow filling the majority of pores in carbon.

In yet another scenario, a non-solvent for sulfur (or a metal sulfide) such as acetone can be induced into the core of the porous carbon scaffold particles and induce nucleation of sulfur (or metal sulfide) particles upon the porous carbon scaffold particle emersion into the sulfur (or metal sulfide) solution. The excess of sulfur (or metal sulfide) solution can be removed by dipping the particles into a solvent and drying. The repetition of this procedure will similarly allow filling the majority of pores in carbon with sulfur or metal sulfides. Third, the external surfaces of the carbon-sulfur (or carbon-sulfide) particles are coated with a metal ion permeable (but polysulfide impermeable) shell.

In a thirteenth example, a method of forming a composite carbon-ceramic or carbon-polymer shell is described. First, a porous carbon shell is produced by, for example, formation of a polymer coating and its subsequent decomposition into a porous carbon layer. The use of porogen or activation may allow one to increase the volume of the pore in the carbon shell. Alternatively, evaporation (or dissolution) of sulfur (or metal sulfide) from the surface layer of the S—C(or metal sulfide-carbon) composite previously described in the twelfth example above may similarly allow for the formation of a porous carbon shell. Once the porous carbon shell is formed, it can then be infiltrated with a polymer or ceramic filler (impermeable to metal sulfide but ideally permeable to metal ions). In the case of a ceramic filler, CVD, ALD, sol-gel, and other methods (including the ones previously described) may be utilized.

Figure 12:
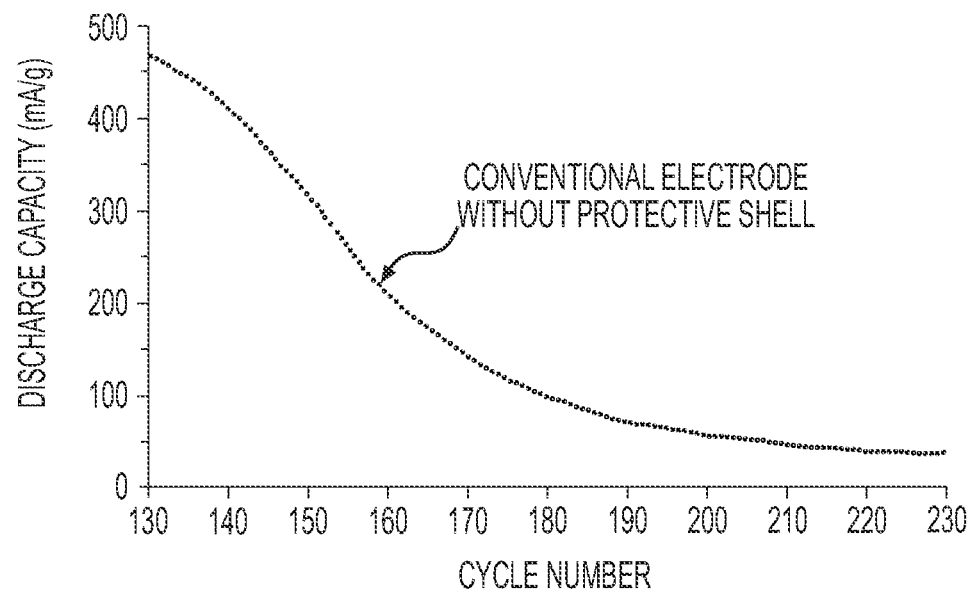
FIG. 12 shows example electrochemical performance data of an electrode produced according an example embodiment as compared to performance of a conventional electrode.
Figure 12:
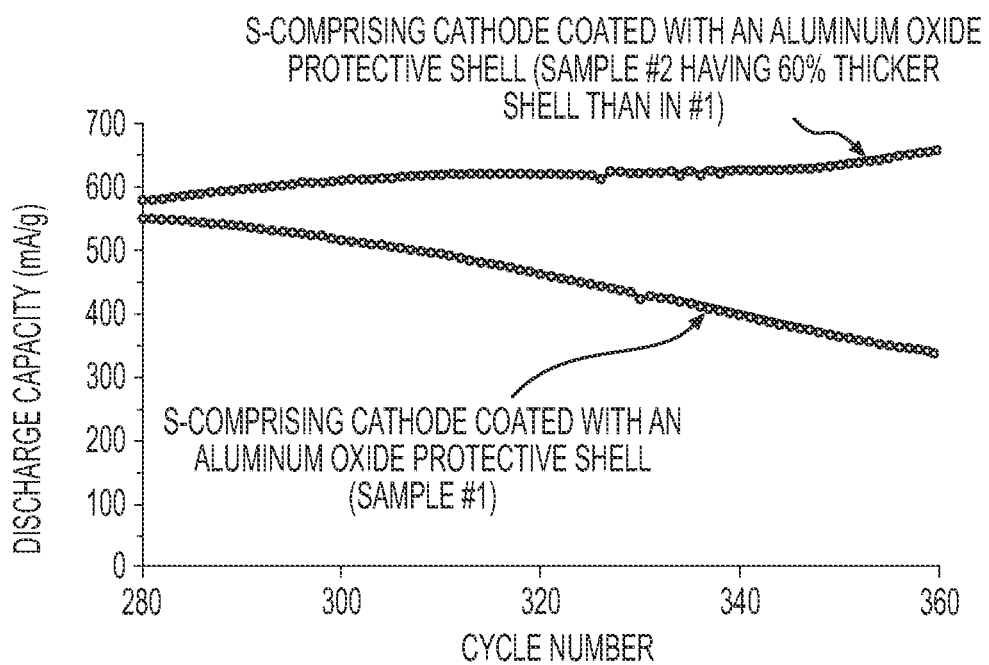

FIG. 12 shows example electrochemical performance data of an electrode produced according an example embodiment as compared to performance of a conventional electrode. For this example, composites composed of a porous carbon-sulfur core were suspended in an aqueous solution of a polyacrilic acid (PAA) binder, cast on a metal foil, and dried. After drying, the electrode was divided into several portions. One portion was directly used as a cathode for the formation of a cell with a lithium foil anode (99.9% purity). The test cells were assembled inside an argon glovebox (less than 1 ppm of $H_2O$). The electrolyte was composed of a 3M bis(trifluoromethanesulfonyl)imide (LiTFSI) salt dissolved in a mixture of dimethoxyethane (DME):1,3-dioxane (DIOX) solvents as electrolyte. 0.2 M $LiNO_3$ (Alfa Aesar, 99.99%) was added to the electrolyte as an electrolyte additive. The charge-discharge tests were conducted at 70° C., between 3.0 and 1.2 V vs. $Li/Li^+$ in a galvanostatic mode. As shown, the conventional cell shows less than 150 stable cycles (top graph). Another portion of the electrode was additionally coated with a conformal layer of aluminum oxide (around ~5 nm) by using a plasma-enhanced atomic layer deposition (ALD) technique. After the shell formation by ALD, the cell was assembled with the alumina coated electrode in exactly the same way as for the conventional electrode. The same electrolyte composition and testing regime was used. However, as further shown, more than 350 stable cycles were achieved after the shell coating step was implemented (bottom graph).

Figure 13:
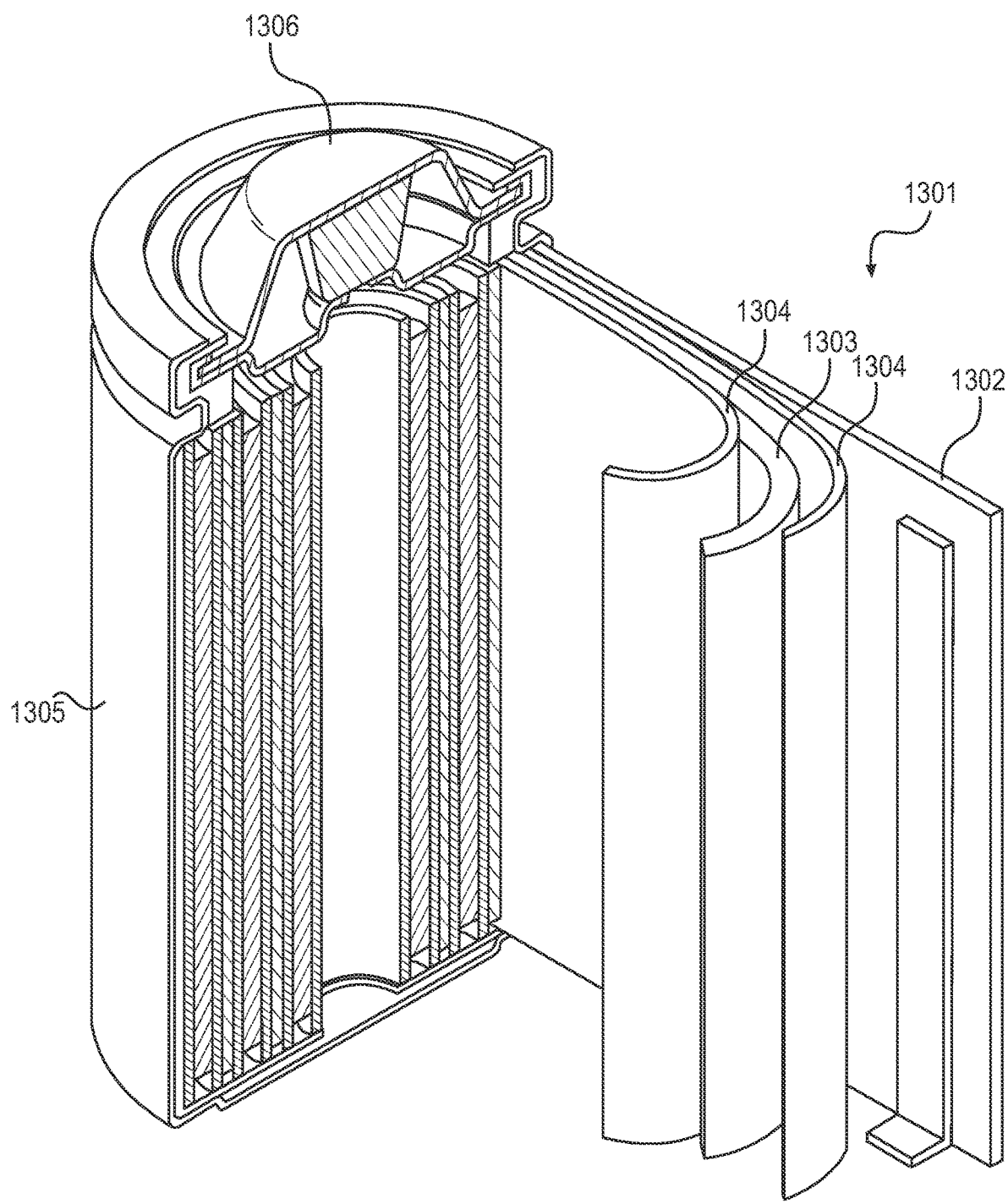
FIG. 13 illustrates an example Li-ion battery in which the above devices, methods, and other techniques, or combinations thereof, may be applied according to various embodiments.

FIG. 13 illustrates an example Li-ion battery in which the above devices, methods, and other techniques, or combinations thereof, may be applied according to various embodiments. A cylindrical battery is shown here for illustration purposes, but other types of arrangements, including prismatic or pouch (laminate-type) batteries, may also be used as desired. The example Li-ion battery 1301 includes a negative anode 1302, a positive cathode 1303, a separator 1304 interposed between the anode 1302 and the cathode 1303, an electrolyte (not shown) impregnating the separator 1304, a battery case 1305, and a sealing member 1306 sealing the battery case 1305. It will be appreciated that the example Li-ion battery 1301 may simultaneously embody multiple aspects of the present invention in various designs.

The preceding description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention, which should only be defined by the following claims and all equivalents.

The invention claimed is:

1. A battery electrode composition, comprising:
a core-shell composite particle comprising a core and a shell,
wherein:
the core comprises (i) graphene and (ii) a $Li_2S$ active material; and
the shell comprises a metal oxide and/or a metal oxyfluoride.

2. The battery electrode composition of claim 1, wherein:
the metal oxide and/or the metal oxyfluoride comprises a lithium metal oxide, an aluminum oxide, a vanadium oxide, and/or a manganese oxide.

3. The battery electrode composition of claim 1, wherein:
the core additionally comprises a Li-ion conductive material.

4. The battery electrode composition of claim 1, wherein:
the core-shell composite particle is characterized by a diameter in a range of about 100 nm to about 80 μm.

5. The battery electrode composition of claim 4, wherein:
the diameter is in a range of about 200 nm to about 20 μm.

6. The battery electrode composition of claim 1, wherein:
the core-shell composite particle is characterized by a diameter in a range of about 20 nm to about 2000 nm.

7. The battery electrode composition of claim 1, wherein:
the core-shell composite particle comprises open channel pores characterized by dimensions in a range of about 0.5 nm to about 100 nm.

8. The battery electrode composition of claim 7, wherein:
the open channel pores are characterized by dimensions in a range of about 1 nm to about 10 nm.

9. The battery electrode composition of claim 1, wherein:
the core-shell composite particle comprises open channel pores occupying less than about 35% of an overall volume of the core-shell composite particle.

10. The battery electrode composition of claim 9, wherein:
the open channel pores occupy less than about 15% of the overall volume.

11. A battery comprising:
an anode;
a cathode, and
an electrolyte disposed between the anode and the cathode,
wherein:
the cathode comprises the battery electrode composition of claim 1.

12. The battery of claim 11, wherein:
the electrolyte comprises an imide salt.

13. The battery of claim 12, wherein:
the imide salt is lithium bis(trifluoromethanesulfonyl) imide (LiTFSI).

14. The battery of claim 11, wherein:
the anode comprises Si and/or graphite.

15. A method of making a battery electrode composition, the method comprising:
(A1) forming a core comprising (i) graphene and (ii) a $Li_2S$ active material; and
(A2) forming a shell at least partially encasing the core to form a core-shell composite particle, the shell comprising a first metal oxide and/or a metal oxyfluoride,
wherein the battery electrode composition comprises at least the core-shell composite particle.

16. The method of claim 15, wherein:
the battery electrode composition comprises the core-shell composite particle as a powder, or
the battery electrode composition comprises the core-shell composite particle as part of an electrode.

17. The method of claim 15, wherein:
the first metal oxide and/or the metal oxyfluoride comprises a lithium metal oxide, an aluminum oxide, a vanadium oxide, and/or a manganese oxide.

18. The method of claim 15, wherein:
the core additionally comprises a Li-ion conductive material.

19. The method of claim 15, wherein:
the core-shell composite particle is characterized by a diameter in a range of about 100 nm to about 80 μm.

20. The method of claim 19, wherein:
the diameter is in a range of about 200 nm to about 20 μm.

21. The method of claim 15, wherein:
the core-shell composite particle is characterized by a diameter in a range of about 20 nm to about 2000 nm.

22. The method of claim 15, wherein:
the core-shell composite particle comprises open channel pores characterized by dimensions in a range of about 0.5 nm to about 100 nm.

23. The method of claim 22, wherein:
the open channel pores are characterized by dimensions in a range of about 1 nm to about 10 nm.

24. The method of claim 15, wherein:
the core-shell composite particle comprises open channel pores occupying less than about 35% of an overall volume of the core-shell composite particle.

25. The method of claim 24, wherein:
the open channel pores occupy less than about 15% of the overall volume.

26. The method of claim 15, wherein:
(A1) comprises precipitating the $Li_2S$ active material from a solution comprising $Li_2S$ and alcohol.

27. The method of claim 15, wherein:
the $Li_2S$ active material comprises $Li_2S$ nanoparticles; and
(A1) comprises emulsifying a solution of $Li_2S$ in an oil phase and adding at least one surfactant.

28. The method of claim 15, wherein:
(A2) comprises forming the shell by at least one deposition process selected from an atomic layer deposition (ALD) process and a chemical vapor deposition (CND) process.

29. The method of claim 28, wherein:
the at least one deposition process is a plasma-enhanced deposition process.

30. The method of claim 28, wherein:
the shell comprises a carbon and/or an aluminum oxide.

31. The method of claim 28, wherein:
the shell comprises lithium; and
the deposition process uses a lithium precursor selected from a Li β-diketonate, an alkyl-Li, a Li-alcoholate.

32. The method of claim 15, wherein:
the shell comprises the first metal oxide; and
(A2) comprises forming the shell by a solution precipitation process.

33. The method of claim 15, wherein:
the shell comprises a carbon; and
(A2) comprises forming the shell by a decomposition of a precursor of the carbon.

34. The method of claim 33, wherein:
the decomposition proceeds in the presence of a catalyst.

35. The method of claim 15, further comprising:
(B1) forming a cathode by depositing the battery electrode composition on a metal foil; and
(B2) assembling a battery from at least an electrolyte, an anode, and the cathode, the electrolyte being disposed between the anode and the cathode.

36. The method of claim 35, wherein:
(B1) additionally comprises depositing a second metal oxide on the cathode by an atomic layer deposition (ALD) process.

37. The method of claim 36, wherein:
the second metal oxide comprises an aluminum oxide.

38. The method of claim 36, wherein:
the ALD process is a plasma-enhanced ALD process.

39. The method of claim 35, wherein:
the battery electrode composition comprises a polymer binder;
the depositing of the battery electrode composition is done without any solvent; and
(B1) additionally comprises exposing the polymer binder to ultraviolet (UV) light to induce cross-linking.

* * * * *